US008332558B2

(12) United States Patent
Porto et al.

(10) Patent No.: US 8,332,558 B2
(45) Date of Patent: Dec. 11, 2012

(54) COMPACT TRACE TREES FOR DYNAMIC BINARY PARALLELIZATION

(75) Inventors: Joao Paulo Porto, Santa Clara, CA (US); Edson Borin, Santa Clara, CA (US); Youfeng Wu, Palo Alto, CA (US); Cheng Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 982 days.

(21) Appl. No.: 12/242,371

(22) Filed: Sep. 30, 2008

(65) Prior Publication Data

US 2010/0083236 A1 Apr. 1, 2010

(51) Int. Cl.
*G06F 9/44* (2006.01)
*G06F 9/00* (2006.01)
(52) U.S. Cl. ..................................... 710/128
(58) Field of Classification Search ........... 717/124–132
See application file for complete search history.

(56) References Cited

U.S. PATENT DOCUMENTS

| 5,828,883 | A * | 10/1998 | Hall ............................... 717/133 |
| 6,170,083 | B1 | 1/2001 | Adl-Tabatabai |
| 6,189,141 | B1 | 2/2001 | Benitez et al. |
| 6,219,827 | B1 | 4/2001 | Man |
| 6,295,644 | B1 | 9/2001 | Hsu et al. |
| 6,338,159 | B1 * | 1/2002 | Alexander et al. ............ 717/128 |
| 6,351,844 | B1 * | 2/2002 | Bala .............................. 717/128 |
| 6,470,492 | B2 | 10/2002 | Bala et al. |
| 6,519,766 | B1 | 2/2003 | Barritz et al. |
| 6,971,092 | B1 | 11/2005 | Chilimbi |
| 7,120,907 | B2 | 10/2006 | Roediger et al. |
| 7,290,251 | B2 | 10/2007 | Livshits |
| 7,600,221 | B1 * | 10/2009 | Rangachari ................... 717/128 |
| 7,694,281 | B2 | 4/2010 | Wang et al. |
| 8,032,867 | B2 * | 10/2011 | Bansal .......................... 717/128 |
| 2002/0066081 | A1 | 5/2002 | Duesterwald et al. |
| 2002/0104075 | A1 | 8/2002 | Bala et al. |
| 2002/0177947 | A1 | 11/2002 | Cayford |
| 2004/0015879 | A1 * | 1/2004 | Pauw et al. ................... 717/127 |
| 2004/0220728 | A1 | 11/2004 | Cayford |
| 2005/0044538 | A1 | 2/2005 | Mantripragada |
| 2005/0050535 | A1 | 3/2005 | Roediger et al. |
| 2005/0071078 | A1 | 3/2005 | Yamada et al. |
| 2005/0149915 | A1 | 7/2005 | Wu et al. |
| 2005/0155018 | A1 | 7/2005 | DeWitt, Jr. et al. |
| 2005/0155026 | A1 | 7/2005 | DeWitt, Jr. et al. |
| 2005/0183067 | A1 * | 8/2005 | Dimpsey et al. .............. 717/128 |
| 2005/0278705 | A1 * | 12/2005 | Castellanos et al. .......... 717/128 |
| 2006/0005180 | A1 | 1/2006 | Nefian et al. |
| 2006/0075390 | A1 * | 4/2006 | McAllister et al. ........... 717/128 |
| 2006/0190924 | A1 | 8/2006 | Bruening et al. |

(Continued)

OTHER PUBLICATIONS

Office Action Received for U.S. Appl. No. 11/241,527, mailed on Aug. 31, 2009, 23 pages.

(Continued)

*Primary Examiner* — Christopher B Shin
(74) *Attorney, Agent, or Firm* — Caven & Aghevli LLC

(57) ABSTRACT

Methods and apparatus relating to compact trace trees for dynamic binary parallelization are described. In one embodiment, a compact trace tree (CTT) is generated to improve the effectiveness of dynamic binary parallelization. CTT may be used to determine which traces are to be duplicated and specialized for execution on separate processing elements. Other embodiments are also described and claimed.

20 Claims, 5 Drawing Sheets

U.S. PATENT DOCUMENTS

2007/0083856 A1      4/2007    Chilimbi et al.
2007/0234305 A1*   10/2007   Mishra et al. ................. 717/128
2008/0163177 A1*    7/2008   Ivanova ....................... 717/128

OTHER PUBLICATIONS

Notice of Allowance Received for U.S. Appl. No. 11/241,527, mailed on Nov. 17, 2009, 15 pages.

Cohn et al., "Hot Cold Optimization of Large Windows/NT Applications", Proceedings of MICRO29, Dec. 2, 1996, pp. 1-10.

Li et al., "A Trace-based Binary Compilation Framework for Energy-Aware Computing", LCTES'04, Jun. 11-13, 2004, pp . 95-106.

Bala et al., "Transparent Dynamic Optimization: The Design and Implementation of Dynamo", HP Laboratories Cambridge, HPL-1999-78, Jun. 1999, pp. 1-102.

Suganuma et al., "Overview of the IBM Java Just-in-Time Compiler", IBM Systems. Journal, vol. 39, No. 1, 2000, pp. 175-193.

Adl-Tabatabai et al., "The Star JIT Compiler: A Dynamic Compiler for Managed Runtime Environments", Intel Technology Journal, vol. 7, Issue 1, Feb. 19, 2003, pp. 19-31.

Baraz et al., "IA-32 Execution Layer: a two-phase dynamic translator designed to support IA-32 applications on Itanium®-based systems", in: 36th Annual IEEE/ACM, International Symposium on Micro architecture (MICRO-36), 2003, 12 pages.

Gal et al., "Incremental Dynamic Code Generation with Trace Trees", Technical Report No. 06-16, Donald Bren School of Information and Computer Science, University of California, Irvine; Dec. 23, 2006, 11 pages.

Hwu et al., "The Superblocic: An Effective Technique for VLIW and Superscalar Compilation", The Journal of Supercomputing, 7(1):229-248, Jan. 1993, 24 pages.

\* cited by examiner

COMPACT TRACE TREES FOR DYNAMIC BINARY PARALLELIZATION

FIELD

The present disclosure generally relates to the field of computing. More particularly, an embodiment of the invention generally relates to compact trace trees for dynamic binary parallelization.

BACKGROUND

The recent shift to the multi-core computing paradigm has changed the way performance scales on new processors. Increasing the number of cores in a microprocessor chip does not automatically improve the performance of single-threaded applications. The new paradigm requires programmers to rewrite code to work in parallel. However, parallel programming is not an easy task, leading to software errors and increased development costs. There is also the issue of extracting parallelism from existing legacy sequential code.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1A:
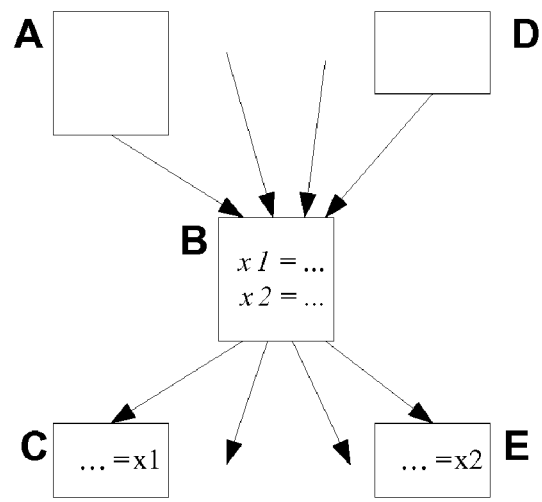
FIGS. 1a and 1b illustrate trace duplication and specialization, which may be used in some embodiments.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Dynamic binary parallelization is a technique that transforms sequential binary code at run-time to improve its performance on parallel processors. Generally, dynamic binary parallelization involves the identification of the most frequently executed fragments of code (also known as hot code/traces or hot regions), so the most frequently executed fragments of code could be parallelized. However, current dynamic binary parallelization techniques may not realize parallelization opportunities.

To this end, some of the embodiments discussed herein may provide new techniques to improve the effectiveness of dynamic binary parallelization. In an embodiment, a new hot region selection technique (referred to here in as Compact Trace Tree (CTT)) is used which enables discovery of more parallelism in sequential binary code. The CTT approach exposes more program parallelism, e.g., by privatizing shared code (such as functions, if-then-else tail code, etc.). Also, a CTT may be a well defined single-entry region of hot code which makes it easy to analyze and parallelize sequential binary code. In turn, a formed CTT may be used to determine which traces are to be duplicated and specialized for execution on separate processing elements (such as separate processors or processor cores of the same or different processors) to generate output data (e.g., for display or storage such as discussed with reference to FIG. 4 or 5).

Generally, the first operation to parallelize a binary program is to construct hot regions. A hot region is constructed from hot traces that are frequently executed from their beginnings to ends. Most Recent Execution Tail (MRET) is an approach for hot trace selection. In MRET, the hot trace heads are first identified based on profiling information. In one embodiment, each loop head (e.g., the backward branch target) is treated as a candidate trace head. Each candidate trace head is instrumented such that a counter is incremented after each execution of the candidate trace head. When the counter exceeds a certain threshold, the candidate trace head becomes a hot trace head. Then, the hot trace is selected as the execution path from the hot trace head to the most recent execution tail (e.g., an instruction that satisfies certain trace tail conditions). If a hot trace branches to a hot trace head, it will be translated to jump to the hot trace led by that trace head. A strongly connected component of hot traces forms a region for parallelization. In the MRET approach, a frequently called function (or branch target) may become a hot trace (e.g., when it is a target of a frequent backward edge). If this function is called from many different sites in the program, all the call sites may eventually be replaced by a jump to the newly created hot trace. In other words, the trace code for the function will be shared among different paths (call sites).

Figure 1B:
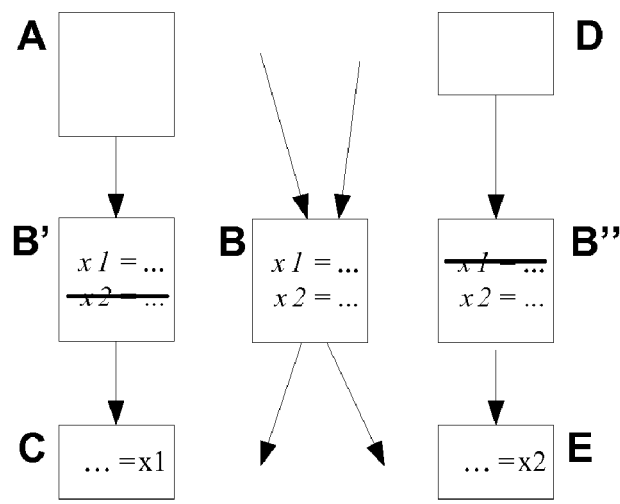

FIGS. 1a and 1b illustrate trace duplication and specialization, which may be used in some embodiments. In particular, FIG. 1a shows a hot trace B created from a function targeted by many call and return sites. In FIG. 1a, B is a shared hot trace (created from a frequently called function). In FIG. 1b, B' and B" are copies of B specialized to the paths A-B-C and D-B-E. Sharing a trace among different paths may limit the parallelization opportunities and the parallelism in the hot region. This happens because different paths may have different interaction with the hot trace.

Figure 2A:
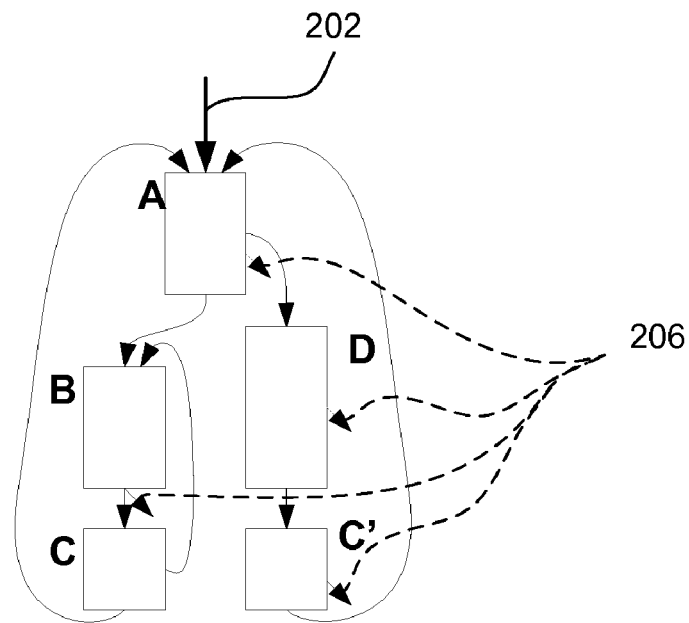
FIGS. 2a and 2b illustrate public and private traces that may be used in accordance with some embodiments.
Figure 2B:
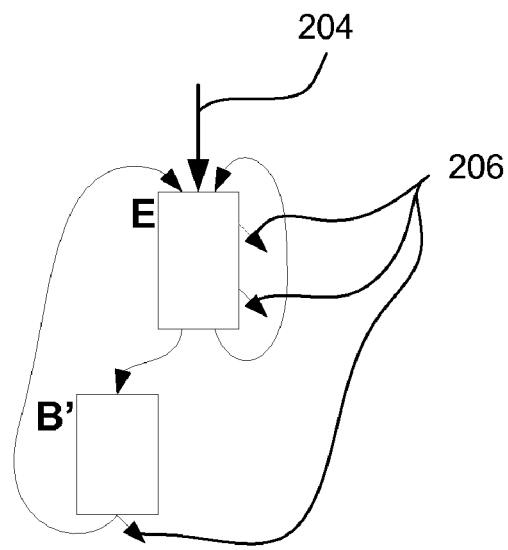

Referring to FIG. 1a, for example, assume that path A-B-C calls B to produce value x1, and path D-B-E calls B to produce x2. Although B is able to produce x1 and x2, each path is only interested in one of the results. If we share B code between the two paths, we cannot remove the code that is not important for each of the paths. However, if we duplicate B in the two call sites (as in function inlining), we may specialize and optimize the inlined B to produce only the required values in the given paths. To this end, FIG. 2b shows the two specialized and optimized paths: A-B'-C (producing x1 and not x2) and D-B"-E (producing x2 and not x1). Moreover, the code on the two paths, A-B'-C and D-B"-E, may run in parallel (e.g., after the dead code and the related dependencies are removed). In some embodiments, specializing important paths is important for identifying parallelism in sequential binary programs.

A Trace Tree approach automatically duplicates and specializes traces. Trace Tree creates a tree composed of traces (which may or may not be hot) that starts at an "anchor node" and goes through all the paths executed until it returns to the anchor node. The Trace Tree starts with a single trace and whenever a side exit is executed, the tree is expanded with a new trace starting at the side exit. The anchor node is a node in the program's CFG (Control Flow Graph) that is targeted by a back edge. Whenever these anchor nodes are found, the runtime system profiles its execution and if the node becomes hot, it creates a tree starting at this node. In this approach, all the traces are expanded until they reach the anchor node again. In other words, a trace in the Trace Tree always ends with a jump to the anchor node. With the Trace Tree approach, the duplication may be too aggressive and the costs to optimize and maintain the duplicated code in the memory may be too high.

In an embodiment, a Compact Trace Tree (CTT) approach selectively duplicates and specializes traces while keeping the amount of duplication low relative to a Trace Tree approach. CTT attempts to avoid the excessive duplication found on Trace Trees by allowing traces to jump backward to parent nodes (which may also be referred to herein as "ancestor" nodes) other than the anchor node and it preserves a tree-like structure allowing paths to be specialized.

In some embodiments, traces may be classified as public or private traces to better distinguish between traces. In particular, FIGS. 2a and 2b illustrate public and private traces that may be used in accordance with some embodiments. In particular, traces A and E are public traces (reachable from cold code, opposite of hot code as defined herein). Traces B, B', C, C' and D are private traces.

Generally, a public trace is one that may be reached by any code, including cold code and traces in other CTTs. This is denoted by the entry 202 and 204 edges in the examples of FIGS. 2a and 2b, respectively. Traces B, B', C, C' and D are private traces. They are private in the sense that they are only reached by traces inside the same CTT. For instance, a private trace may be reached by either its immediate predecessors or by one of its successors. Also, a private trace may branch to any of its ancestor nodes. For example, on the left trace of FIG. 2a, node B is reached by A (immediate predecessor) or by C (one of its successors). C is duplicated (as C') because it is a branch target for both nodes B and D. Also, in FIG. 2b, node B (as B') is duplicated because it is the branch target of block A and E. As shown, a CTT may contain inner loops. Each inner loop compacts the fully expanded loop in a corresponding Trace Tree and may significantly reduce the amount of duplications. Since parallelization algorithms may handle loop relatively easily, the compaction of a fully expanded inner loop will not hinder parallelism. For example, the parallelizer may often apply decoupled pipelining or speculative multi-threading to the loop successfully.

Another difference between CTT and Trace Tree is that the Trace Tree approach keeps a single tree for the whole program execution. It contains all code that is executed at least once. In contrast, the CTT approach keeps a forest of compact trees as it eliminates the cold code that is infrequently executed, such that each compact tree is a well defined region of hot traces with a single entry point (referred to as a "root" trace). The examples in FIGS. 2a and 2b show a forest with two compact trees with root traces A and E. All the root traces are public traces.

During the program execution, the control flow may leave a compact tree through a cold side exit 206. The CTT construction algorithm profiles edge execution frequencies and, whenever an edge becomes frequently executed (hot), the CTT expands the tree through the hot edge into the same CTT. Otherwise it exits the CTT to cold code 206.

During the expansion, the CTT records new branches following the control flow execution through the hot edges until it reaches any stop condition, e.g., jumping to a parent trace. Contrary to Trace Tree, CTT allows a trace to branch to a parent node other than the root node. This allows the CTT to reduce code duplication when compared to the Trace Tree approach.

Figure 3:
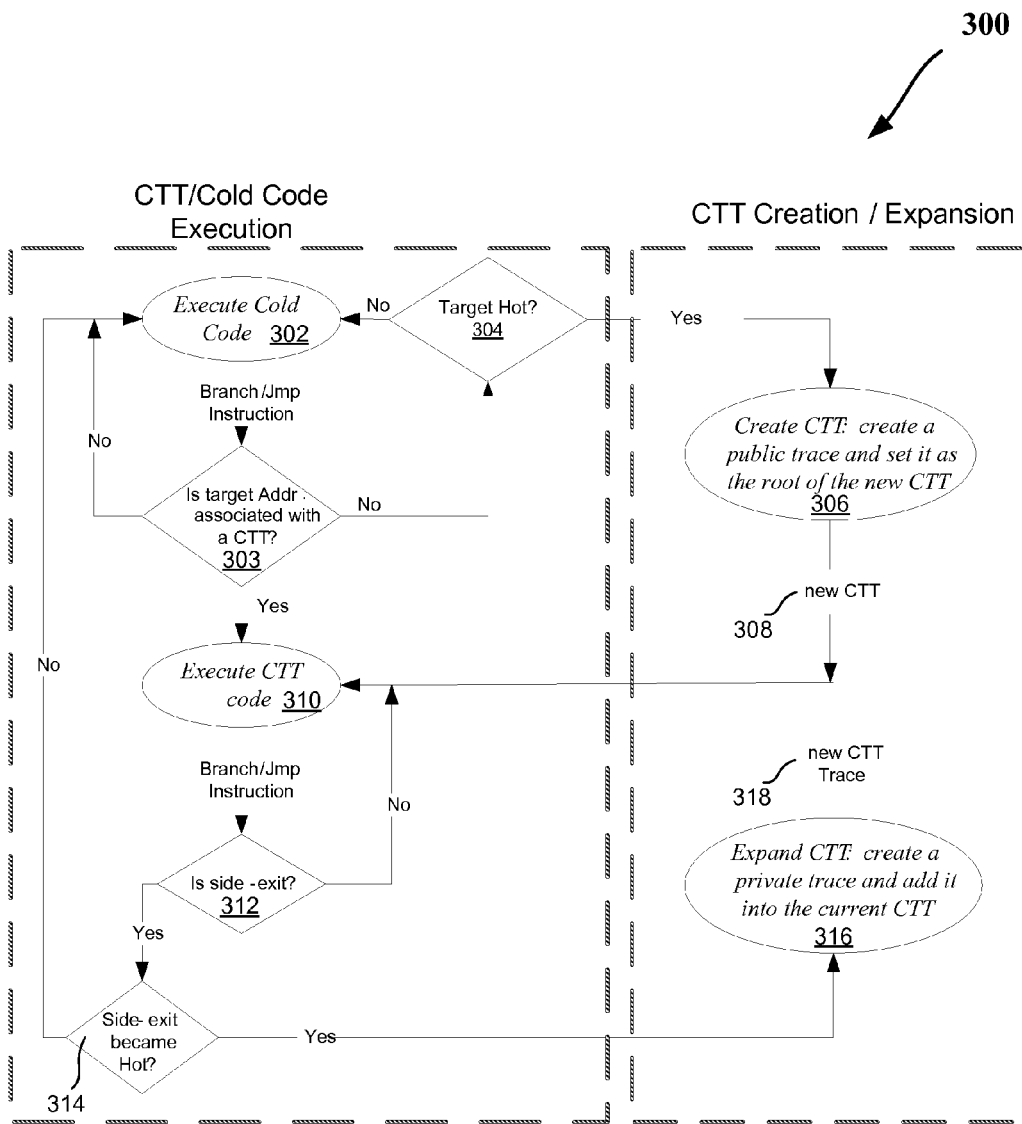
FIG. 3 illustrates a flow diagram of a method according to an embodiment of the invention.

FIG. 3 illustrates a method 300 to apply a CTT approach, according to an embodiment. Operations of method 300 may be performed during run-time. As shown in FIG. 3, some operations may be performed during CTT/Cold Code execution (or application execution) while others may be performed during CTT creation or expansion. The program execution starts at a cold block 302. In an embodiment, the execution control flows from one cold block to another at 302 until a given block becomes hot 304. Whenever the first block becomes hot, a public trace may be created as the root of a new CTT 306. As an example, the public trace E, in FIG. 2b, was first created because its code became hot. In an embodiment, every new public trace starts a new CTT.

After creating the new CTT (initially composed of a single hot trace) at operation 306, the new hot trace 308 is executed at operation 310. The new CTT code is executed 310 until a side exit is reached 312. As shown in FIG. 3, if during execution of cold code at operation 302, a branch or jump instruction is detected, an operation 303 may determine whether the target address of the branch or jump instruction is associated with a CTT. If there is no associated CTT, the method continues with operation 304. Otherwise, if the target address of the instruction is associated with a CTT, the associated CTT is executed 310.

After reaching a side exit 312, it is determined whether the side exit has became hot 314. If the side exit did not become hot, the method 300 resumes with a jump to cold code and continue executing cold code 302. Otherwise, the CTT is expanded 316 by creating a private trace and adding it into the CTT 316. In the example of FIG. 2b, the public trace E was first created. Then, it was executed until the side exit E→B became hot. After this, the CTT was expanded through the hot edge. Notice that trace B' was added to the CTT after the E→B edge became hot. Again, after expanding the CTT, the new traces 318, expanded into the CTT, are executed 310.

In an embodiment, the public trace is formed in the same way as in the MRET approach discussed above. The path may be recorded by following the control flow until any stop condition is reached. Stop conditions may include (but are not limited to): (a) reaching a node already in the path being recorded; and/or (b) reaching an undesired control flow instruction (a system call instruction or an indirect branch, for example).

In one embodiment, a private trace is constructed similarly to a public trace, except for the following two operations: (a) the trace recording also stops when it reaches a node that is an ancestor node in the tree (As an example, when recording the private trace B' (in the CTT of FIG. 2b), the trace recording stops when it reached node A (ancestor of B).); and/or (b) after recording a new trace into a CTT, the side-exit control flow is rerouted to the new CTT trace (which is also referred to as "re-linking").

Figure 4:
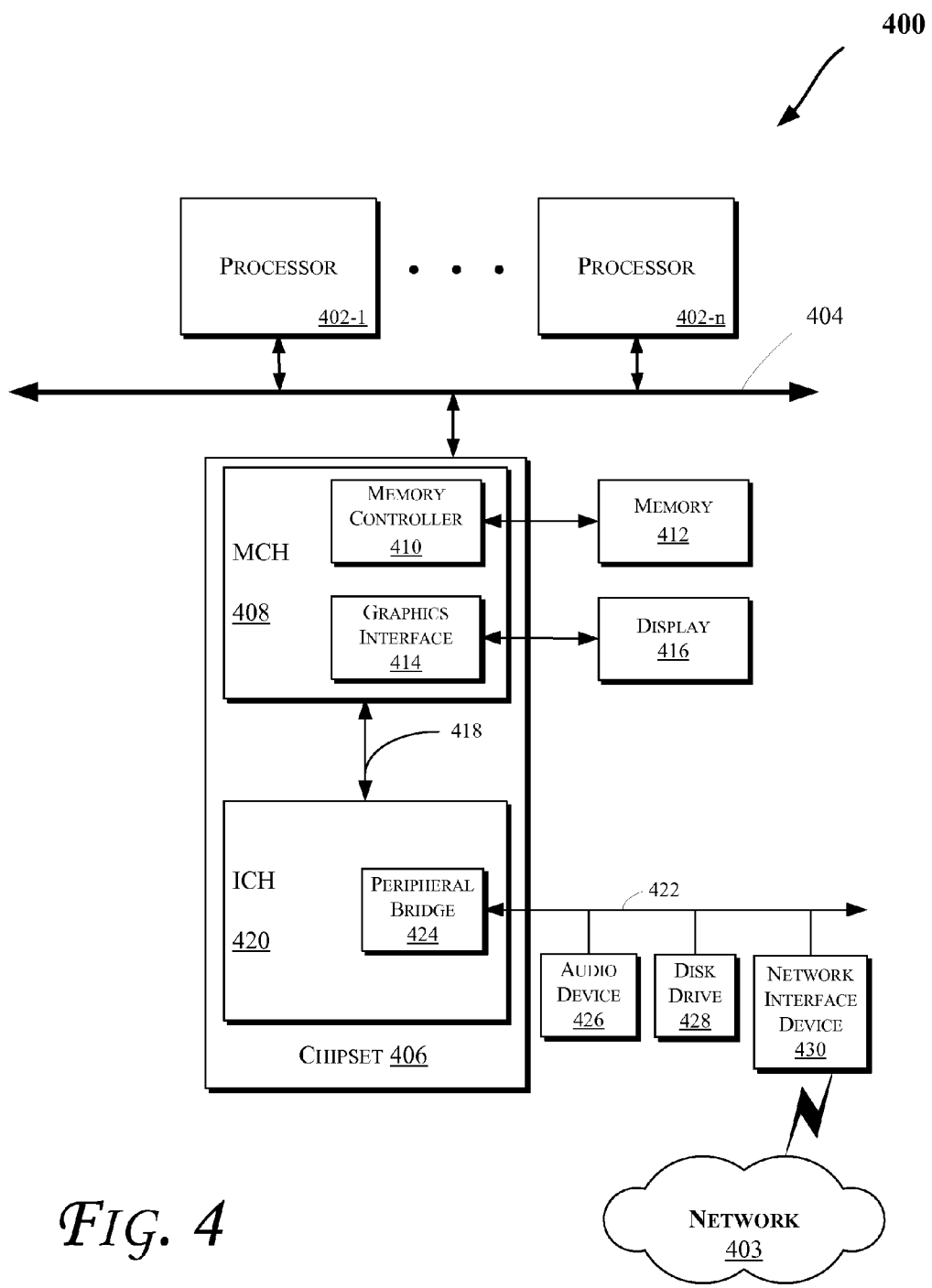
FIGS. 4 and 5 illustrate block diagrams of embodiments of computing systems, which may be utilized to implement some embodiments discussed herein.

FIG. 4 illustrates a block diagram of an embodiment of a computing system 400. In various embodiments, one or more of the components of the system 400 may be provided in various electronic devices capable of performing one or more of the operations discussed herein with reference to some embodiments of the invention. For example, one or more of the components of the system 400 may be used to perform the operations discussed with reference to FIGS. 1-3, e.g., by generating values corresponding to CTTs, executing parallelized sequential code on a plurality of processors or processor cores, etc. in accordance with the operations discussed herein. Also, various storage devices discussed herein (e.g., with reference to FIGS. 4 and/or 5) may be used to store data (including instructions), operation results, CTT related data, etc. In one embodiment, data associated with operations of method 400 of FIG. 4 may be stored in memory device(s) (such as memory 412 or one or more caches (e.g., L1, mid-level, or last level caches in an embodiment) present in processors 402 of FIG. 4 or 502/504 of FIG. 5).

Moreover, the computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Additionally, the processors 402 may utilize an SIMD (Single Instruction, Multiple Data) architecture. Moreover, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412. The memory 412 may store data, including sequences of instructions that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display 416. The display 416 may be used to show a user results of operations associated with the Brownian Bridge algorithm discussed herein. In one embodiment of the invention, the graphics interface 414 may communicate with the display 416 via an accelerated graphics port (AGP). In an embodiment of the invention, the display 416 may be a flat panel display that communicates with the graphics interface 414 through, for example, a signal converter that translates a digital representation of an image stored in a storage device such as video memory or system memory into display signals that are interpreted and displayed by the display 416. The display signals produced by the interface 414 may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430, which may be in communication with the computer network 403. In an embodiment, the device 430 may be a NIC capable of wireless communication. Other devices may communicate via the bus 422. Also, various components (such as the network interface device 430) may communicate with the MCH 408 in some embodiments of the invention. In addition, the processor 402 and the MCH 408 may be combined to form a single chip. Furthermore, the graphics interface 414 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
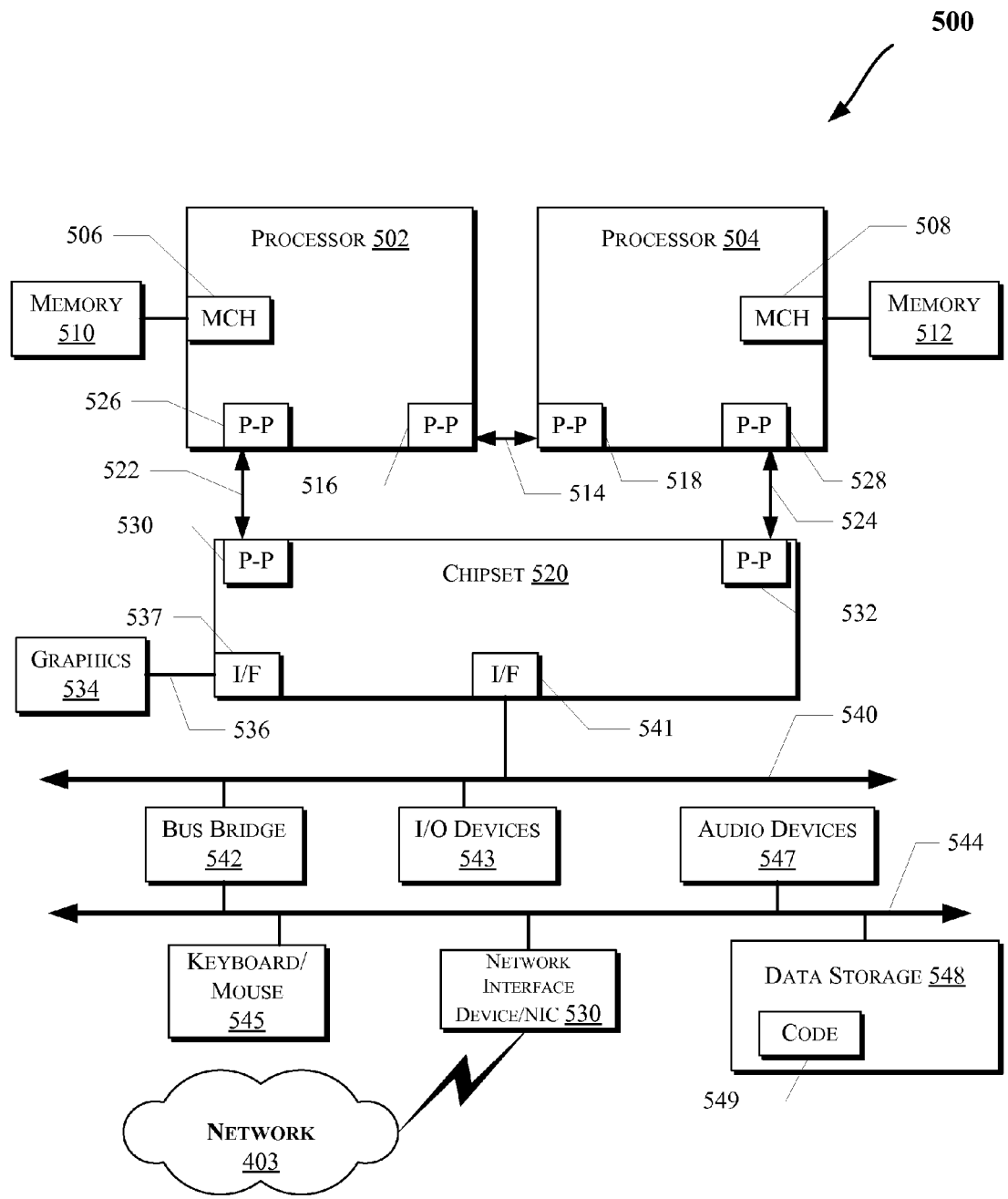

More specifically, FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 412 of FIG. 4.

The processors 502 and 504 may be any suitable processor such as those discussed with reference to the processors 402 of FIG. 4. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be provided by utilizing the processors 502 and 504. For example, the processors 502 and/or 504 may perform one or more of the operations of FIGS. 1-4. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 543 may be coupled to other devices such as a keyboard/mouse 545, the network interface device 530 discussed with reference to FIG. 5 (such as modems, network interface cards (NICs), or the like that may be coupled to the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software (including, for example, micro-code that controls the operations of a processor such as the processors discussed with reference to FIGS. 4-5), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed with respect to FIGS. 4-5.

Additionally, such tangible computer-readable media may be downloaded as a computer program product, wherein the program may be transferred from a remote computer (e.g., a server) to a requesting computer (e.g., a client) by way of data signals in propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a memory to store sequential code having a plurality of traces; and
a processor to:
detect a hot trace in the plurality of traces;
set the hot trace as a root trace of a compact trace tree;
detect a hot side exit corresponding to one of the traces of the compact trace tree; and
creating a private trace, coupled to the hot side exit, in the compact trace tree.

2. The apparatus of claim 1, wherein the compact trace tree is to comprise one or more public traces and private traces.

3. The apparatus of claim 1, the processor is to classify a first trace of the plurality of traces as public in response to a determination that the first trace may be reached by any code.

4. The apparatus of claim 3, wherein the processor is to classify the root trace as a public trace.

5. The apparatus of claim 1, wherein the processor is to classify a first trace of the plurality of traces as private in response to a determination that the first trace may be reached by one of its immediate predecessor traces or by one of its successor traces in the compact trace tree.

6. The apparatus of claim 1, wherein the compact trace tree has a single entry point at the root trace.

7. The apparatus of claim 1, wherein the processor is to classify a first trace of the plurality of traces as private in response to a determination that the first trace may reach any of its ancestor nodes.

8. The apparatus of claim 1, wherein the processor comprises a plurality of processor cores and wherein at least some hot traces of the plurality of traces are duplicated and specialized to execute on different ones of the plurality of processor cores.

9. The apparatus of claim 1, wherein the processor comprises a plurality of processor cores and wherein at least one private trace of the plurality of traces is duplicated and specialized for execution on different processor cores.

10. A method comprising:
in response to detection of a hot trace from a plurality of traces, setting the hot trace as a root trace of a compact trace tree; and
in response to detection of a hot side exit, creating a private trace, coupled to the hot side exit, in the compact trace tree.

11. The method of claim 10, wherein the compact trace tree is to comprise one or more public traces and private traces.

12. The method of claim 10, further comprising duplicating and specializing one or more of private traces from the plurality of traces for execution on separate processor cores.

13. The method of claim 10, wherein the compact trace tree has a single entry point at the root trace.

14. The method of claim 10, further comprising classifying the root trace as a public trace.

15. The method of claim 10, further comprising classifying a trace as private in response to a determination that that trace may reach any of its ancestor nodes.

16. A computer-readable medium comprising one or more instructions that when executed on a processor configure the processor to perform one or more operations to:
set a hot trace as a root trace of a compact trace tree in response to detection of the hot trace from a plurality of traces; and
create a private trace, coupled to a hot side exit, in the compact trace tree in response to detection of the hot side exit.

17. The computer-readable medium of claim 16, further comprising one or more instructions that when executed on a processor configure the processor to duplicate and specialize one or more of private traces from the plurality of traces for execution on separate processor cores.

18. The computer-readable medium of claim 16, further comprising one or more instructions that when executed on a processor configure the processor to classify the root trace as a public trace.

19. The computer-readable medium of claim 16, further comprising one or more instructions that when executed on a processor configure the processor to store the plurality of traces in a memory.

20. The computer-readable medium of claim 16, wherein the compact trace tree is to comprise one or more public traces and private traces.

\* \* \* \* \*

UNITED STATES PATENT AND TRADEMARK OFFICE
CERTIFICATE OF CORRECTION

| | | |
|---|---|---|
| PATENT NO. | : 8,332,558 B2 | Page 1 of 1 |
| APPLICATION NO. | : 12/242371 | |
| DATED | : December 11, 2012 | |
| INVENTOR(S) | : Joao Paulo Porto et al. | |

It is certified that error appears in the above-identified patent and that said Letters Patent is hereby corrected as shown below:

In the Claims:

In column 8, line 8, in claim 3, delete "claim 1, the" and insert -- claim 1, wherein the --, therefor.

Signed and Sealed this
Seventeenth Day of September, 2013

Teresa Stanek Rea
*Deputy Director of the United States Patent and Trademark Office*